US012747808B2

(12) United States Patent
Levold et al.

(10) Patent No.: US 12,747,808 B2
(45) Date of Patent: Sep. 29, 2026

(54) DIRECT TIE-IN OF A PIPELINE

(71) Applicant: Equinor Energy AS, Stavanger (NO)

(72) Inventors: Erik Levold, Stavanger (NO); Håvar Ilstad, Stavanger (NO); Marie Finstad Opgård, Stavanger (NO)

(73) Assignee: EQUINOR ENERGY AS, Stavanger (NO)

( * ) Notice: Subject to any disclaimer, the term of this patent is extended or adjusted under 35 U.S.C. 154(b) by 147 days.

(21) Appl. No.: 18/035,398

(22) PCT Filed: Oct. 7, 2021

(86) PCT No.: PCT/NO2021/050206
§ 371 (c)(1),
(2) Date: May 4, 2023

(87) PCT Pub. No.: WO2022/098243
PCT Pub. Date: May 12, 2022

(65) Prior Publication Data

US 2023/0407992 A1 Dec. 21, 2023

(30) Foreign Application Priority Data

Nov. 5, 2020 (GB) ...................................... 2017495

(51) Int. Cl.
*F16L 1/26* (2006.01)
*F16L 1/16* (2006.01)

(52) U.S. Cl.
CPC .. *F16L 1/26* (2013.01); *F16L 1/16* (2013.01)

(58) Field of Classification Search
CPC ......... F16L 1/26; F16L 1/165; E21B 43/0107; E21B 43/0135; E21B 43/013
See application file for complete search history.

(56) References Cited

U.S. PATENT DOCUMENTS 4,906,137 A * 3/1990 Maloberti ............... E21B 43/01 405/169
5,491,880 A * 2/1996 Labiche .............. F16L 55/1686 29/402.09

(Continued)

FOREIGN PATENT DOCUMENTS

FR 2 859 496 A1 3/2005
GB 2545883 A 6/2017

(Continued)

OTHER PUBLICATIONS

Combined Search and Examination Report issued in GB2017495.9, dated Jul. 23, 2021.

(Continued)

*Primary Examiner* — Sean D Andrish
(74) *Attorney, Agent, or Firm* — Birch, Stewart, Kolasch & Birch, LLP

(57) ABSTRACT

A method of installing a subsea pipeline having a direct tie-in between a first section of the pipeline and a subsea structure, wherein, after installation, the first section is located at a tie-in position. The method comprises: laying at least a portion of the pipeline from a laying vessel, the at least a portion of the pipeline including the first section and a second section of the pipeline, such that the first section is beyond the tie-in position in the laying direction, and the first section and the tie-in position are beyond the second section in the laying direction; either before, during or after said laying, configuring the second section such that bending will be preferentially induced in the second section of the at least a portion of the pipeline when the first section is pushed or pulled back to the tie-in position; pushing or pulling the first section back to the tie-in position, wherein, responsive to said pushing or pulling, bending is preferentially induced in the second section.

11 Claims, 10 Drawing Sheets

(56) References Cited

U.S. PATENT DOCUMENTS

| | | | | |
|---|---|---|---|---|
| 7,600,569 | B2 * | 10/2009 | Routeau | F16L 1/12 166/344 |
| 2008/0014026 | A1 | 1/2008 | Routesu et al. | |
| 2020/0032619 | A1 * | 1/2020 | Messias | E21B 43/0107 |
| 2020/0318759 | A1 | 10/2020 | Fistad et al. | |

FOREIGN PATENT DOCUMENTS

| | | | |
|---|---|---|---|
| WO | WO 0140695 | * | 6/2001 |
| WO | WO 2017/146582 A1 | | 8/2017 |

OTHER PUBLICATIONS

International Search Report (PCT/ISA/210) issued in PCT/NO2021/050206, dated Nov. 9, 2021.

Nystrøm et al., "Lay Method to Allow for Direct Tie-in of Pipelines", XP055368418, Proccedings of the Twenty-fifth International Ocean and Polar Engineering Conference, Kona, Big Island, Hawaii, USA, Jun. 21-26, 2015, p. 164.

Written Opinion of the International Searching Authority (PCT/ISA/237) Issued in PCT/NO2021/050206, dated Nov. 9, 2021.

* cited by examiner

DIRECT TIE-IN OF A PIPELINE

TECHNICAL FIELD

The present invention relates to the direct tie-in of a subsea pipeline.

BACKGROUND

Pipelines for the transport of hydrocarbons, e.g. oil or gas, or pipelines for water injection, are typically laid along the seabed using a laying vessel. Such subsea pipelines can be installed between, for example, two subsea structures, where the subsea structures may be templates, "christmas trees", riser bases, Blowout Preventers (BOPs), or some other structures. The pipeline can be laid in the vicinity of the subsea structure in question, and an end, or an intermediate section of the pipeline, is connected (or "tied-in") to a subsea structure using a separate jumper or spool. The extra components and procedures associated with the use of separate jumpers or spools result in high costs for the installation process. Direct tie-in methods can also be used and are often preferable. These methods include:

- direct pull-in, in which an end of the pipeline is pulled close to the subsea structure using a winch location on the laying vessel, and the tie-in is completed using a remotely operated vehicle (ROV) and alignment apparatus; and
- deflect to connect, in which a wire is attached to the end of the pipeline, where the wire is routed through the subsea structure to a winch, and the wire is used to pull the subsea end of the pipeline directly to the subsea structure.

The flexibility (or overlength) necessary to enable the pull-in in such direct tie-in procedures can be provided by laying the pipeline in a curve, or by providing residual curvature (i.e. a permanent bend) in a section of the pipeline. Especially for deep water laying operations, it is challenging to introduce route curves or install residual curvature sections due to the length of the pipeline in the water column, i.e. the length from the pipeline installation vessel to the seabed. Further, large forces are required for the pull-in procedure, which risk damage to the pipeline and/or subsea structure.

SUMMARY

It is an object of the present invention to overcome or at least mitigate the problems identified above.

According to a first aspect of the present invention there is provided a method of installing a subsea pipeline having a direct tie-in between a first section of the pipeline and a subsea structure, wherein, after installation, the first section is located at a tie-in position. The method comprises: laying at least a portion of the pipeline from a laying vessel, the at least a portion of the pipeline including the first section and a second section of the pipeline, such that the first section is beyond the tie-in position in the laying direction, and the first section and the tie-in position are beyond the second section in the laying direction. The method further comprises either before, during or after said laying, configuring the second section such that bending will be preferentially induced in the second section of the at least a portion of the pipeline when the first section is pushed or pulled back to the tie-in position; and pushing or pulling the first section back to the tie-in position, wherein, responsive to said pushing or pulling, bending is preferentially induced in the second section.

The second section may be configured such that bending will be preferentially induced in the second section under compression of the at least a portion of the pipeline.

The first section of the pipeline may include an end of the pipeline.

The first section of the pipeline may include an intermediate section of the pipeline.

Said laying may include laying the first section of the pipeline onto the subsea structure.

The first section of the pipeline may include an integral manifold for direct tie-in to the subsea structure.

The first section may include features configured to engage with a mechanism of the subsea structure for pushing or pulling the first section back to the tie-in position.

The first section may be pulled or pushed back to the tie-in position using a mechanism installed in the subsea structure.

The first section may be pulled or pushed back to the tie-in position using a mechanism included in the first section.

The first section may be pulled back to the tie-in position using a winch located on a vessel or the seabed, or an ROV.

The first section may be pulled back to the tie-in position using a vessel, a winch located on a vessel or the seabed, or an ROV connected to the second section.

The at least a portion of the pipeline may include a collar configured to engage with a fine guide of the subsea structure to pull the first section back towards the tie-in position as the first section is lowered towards the subsea structure.

Configuring the second section may include increasing the buoyancy of the second section relative to the rest of the pipeline.

Increasing the buoyancy may comprise attaching buoyancy units to the second section.

Increasing the buoyancy may comprise removing at least part of a coating of the second section of the pipeline, or replacing at least part of the coating with a different coating material with a higher buoyancy.

Configuring the second section may include laying the second section onto a structure or feature such that the second section is displaced vertically or horizontally relative to adjacent sections of the pipeline, or installing such a structure or feature after the second section has been laid.

Configuring the second section may include displacing the second section horizontally and/or vertically using a wire extending from a vessel or an ROV or AUV.

The second section may be not located in a first free span of the pipeline, wherein the first free span is a portion of the pipeline that is adjacent to the tie-in position and is not in contact with the seabed.

The subsea structure may be a template.

Embodiments of the invention will now be described by way of example only and with reference to the accompanying drawings, in which:

DETAILED DESCRIPTION

Figure 1A:
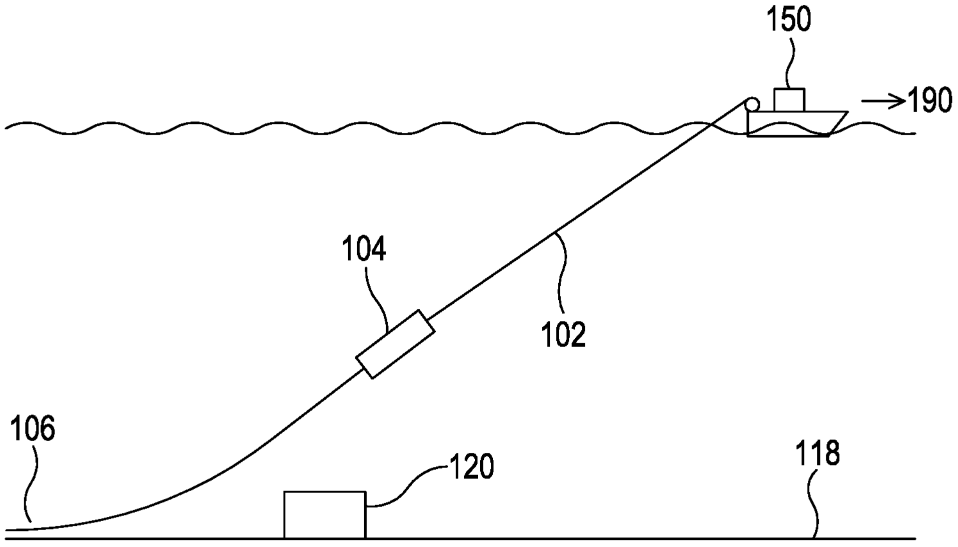
FIG. 1A shows an initial stage of a procedure for installing a pipeline, where the first section of the pipeline that is to be tied-in to a subsea structure is an intermediate section of the pipeline.

The invention provides a method of installing a subsea pipeline having a direct tie-in between a first section of the pipeline and a subsea structure, wherein, after installation, the first section is located at a tie-in position. The pipeline is e.g. a pipeline for transporting hydrocarbons such as oil and/or gas, a pipeline for transporting water for injection, or any other suitable pipeline. The method comprises laying at least a portion of the pipeline from a laying vessel, the at least a portion of the pipeline including the first section and a second section of the pipeline, such that the first section is beyond the tie-in position in the laying direction, and the first section and the tie-in position are beyond the second section in the laying direction. The method further comprises, either before, during or after said laying, configuring the second section such that bending will be preferentially induced in the second section of the at least a portion of the pipeline when the first section is pushed or pulled back to the tie-in position; and pushing or pulling the first section back to the tie-in position, wherein, responsive to said pushing or pulling, bending is preferentially induced in the second section.

In the method of the invention, the pipeline is laid so that the first section of the pipeline, which is the section of the pipeline that will be directly tied in to the subsea structure, is beyond the tie-in position in the laying direction. The first section is then pulled or pushed to the tie-in position. This is in contrast to prior art methods in which the section of the pipeline that is to be directly tied in is laid short of a tie-in position, and then that section is pulled to the tie-in position.

In such prior art 'pull-in' methods, the pipeline must be laid with route curves, or a residual curve section must be provided in the pipeline, to provide the 'slack' necessary for the pipeline to be pulled in to the tie-in position. The route curves or residual curves must typically be located far from the tie-in position, because a section including a residual curve will typically have to rotate when the section is laid onto the seabed, so that the whole curved section lies flat on the seabed. This will cause corresponding rotation and/or twisting in adjacent portions of the pipeline, and if the portion of the pipeline that is to be tied in undergoes such twisting, the pipeline end or section to be tied in may be displaced, making the pull-in and tying-in procedure more difficult. The curve being located far from the tie-in position means that larger forces are required for the pull-in procedure (relative to the case where a curve is closer to the tie-in position). The use of such larger forces increases the risk of damage to the pipeline and/or subsea structure.

Such route curves or residual curves are not required, or may not be required, in the method of the invention. This means that less pipe length is required, and the tie-in procedure can be more easily carried out, especially in deep water. Further, routing restrictions or constraints that may be imposed when route curves or residual curves are necessary are not required. Still further, the second section (in which bending will be preferentially induced) can be located closer to the tie-in position (relative to the necessary location of a residual curve or route curve), meaning that lower forces are required during the tie-in procedure.

FIG. 1A illustrates an initial stage of a process of installing a subsea pipeline 102 for direct tie-in between a first section 104 of the pipeline and a subsea structure 120. The subsea structure is e.g. a wellhead or template. The pipeline 102 is laid from a laying vessel 150 onto the seabed 118. The laying vessel 150 moves in a laying direction indicated by arrow 190. The pipeline includes a second section 106 that is laid before the first section 104, i.e. the first section 104 is beyond the second section 106 in the laying direction 190. In the embodiment shown in FIG. 1A, the first section 104 includes, or is, an intermediate section, i.e. a mid-section, of the pipeline. In an embodiment, the first section 104 includes an integral manifold that is pre-installed and is laid with the pipeline for direct tie-in between the manifold and the subsea structure.

Figure 1B:
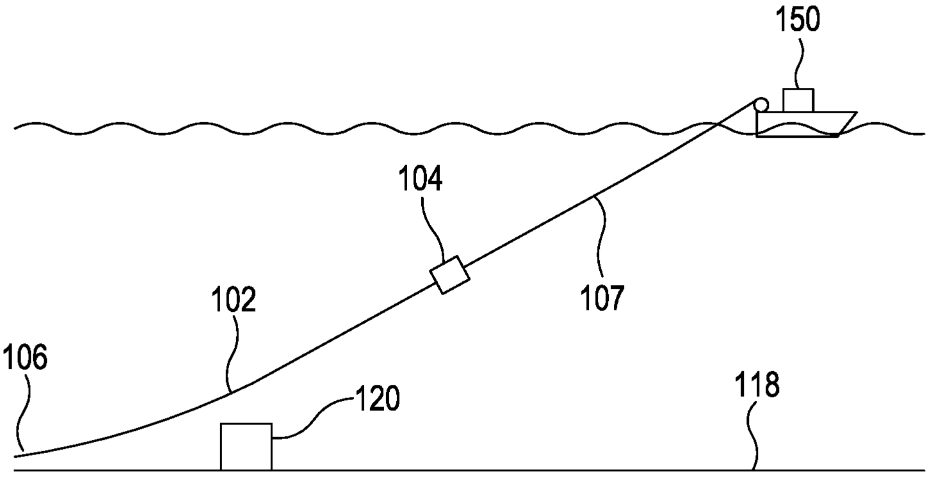
FIG. 1B shows an initial stage of a procedure for installing a pipeline, where the first section of the pipeline that is to be tied in to a subsea structure is an end of the pipeline.

FIG. 1B illustrates an alternative embodiment in which the first section 104 includes an end of the pipeline 102, and the end of the pipeline is laid using a line 107 extending from the laying vessel 150. The subsequent FIGS. illustrate the method of the invention as performed for a first section that is an intermediate section of the pipeline, in line with FIG. 1A. However, it is to be understood that the operations depicted in FIGS. 2, 3, 4A-C, 5 and 6A-C can equally be performed for a pipeline for which the first section 104 includes, or is, an end of the pipeline.

At the initial stage shown in FIGS. 1A and 1B, the second section 106 has been laid onto the seabed 118, and the first section 104 has not yet been laid.

Figure 2:
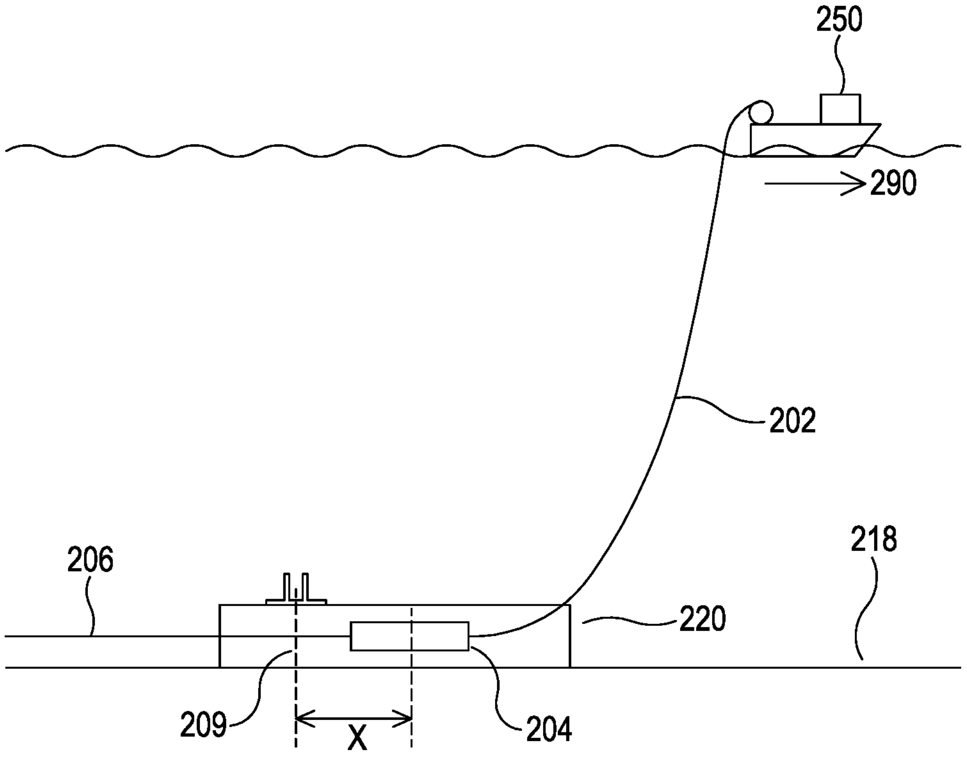
FIG. 2 shows a subsequent stage of the installation procedure, where the first section of the pipeline has been laid.

FIG. 2 illustrates a subsequent stage of the installation process, for an embodiment in which the first section 204 is laid onto the subsea structure 220. In FIG. 2, reference numerals for like features are incremented by one hundred, relative to FIGS. 1A and 1B. The laying vessel 250 is laying the pipeline 202 in a laying direction indicated by arrow 290. The second section 206 has been laid onto the seabed 218, and the first section 204, which in this embodiment is an intermediate portion of the pipeline, has been laid onto the seabed structure 220. Therefore, at least a portion of the pipeline has been laid, the at least a portion including the first section and the second section of the pipeline. It is noted that, typically, a particular portion along the length of the pipeline can be laid with an accuracy of plus or minus 1 m.

In contrast with existing procedures in which a to-be-tied-in section of a pipeline is laid short of a subsea structure (and then subsequently pulled in for tie in to the structure), the pipeline is laid so that the first section of the pipeline is beyond a tie-in position 209 in the laying direction. That is, the pipeline is laid so that the first section must be moved in a direction substantially opposite to the laying direction to reach the tie-in position 209. The distance between the first section and the tie-in position is indicated in FIG. 2 by x. The tie-in position 209 is the location at which the first section 204 will be located after installation is complete, i.e. the position in which the first section is retained for direct tie-in to be completed between the first section and the subsea structure. The tie-in position 209 and the first section 204 are beyond the second section 206 in the laying direction 290.

The second section 206 is configured such that bending will be preferentially induced in the second section when the first section is pushed or pulled back to the tie-in position. In certain embodiments, the at least a portion of the pipeline is placed under compression when the first section is pushed or pulled back to the tie-in position. That is, the second section is configured so that when the first section is moved in a direction substantially opposite to the laying direction to bring the first section back to the tie-in position, bending occurs preferentially in the second section of the pipeline. The second section is configured in this way before the first section is pulled or pushed back to the tie-in position. This may be before the second section is laid, during laying of the second section, or after the second section is laid. In FIG. 2, no bend is shown in the second section 206. However, it is to be understood that configuring the second section may include displacement of the second section in the vertical and/or horizontal direction, relative to the surrounding portions of the pipeline, i.e. providing some initial degree of bending. Further details on how the second section is configured in this way are set out below in relation to FIGS. 6A, 6B and 6C.

Figure 3:
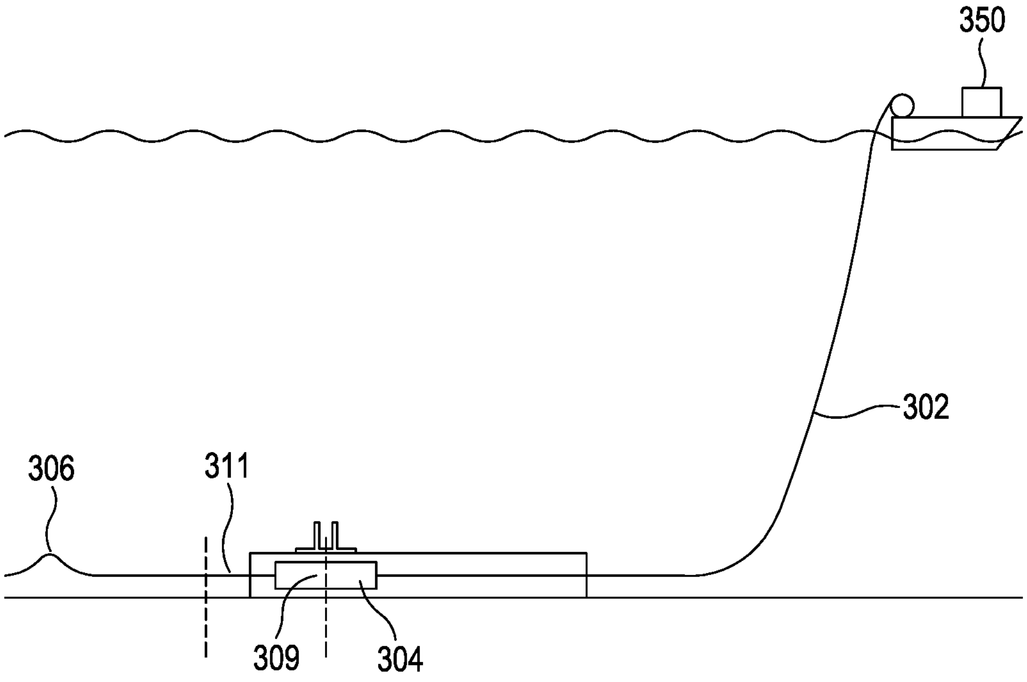
FIG. 3 illustrates the installation procedure after the first section of the pipeline has been pulled or pushed back to the tie-in position, and bending has been preferentially induced in a second section of the pipeline.

FIG. 3 shows a later stage of the installation process. Starting from the configuration shown in FIG. 2, the first section 304 of the pipeline 302 is pushed or pulled back to the tie-in position 309, i.e. the first section is moved in a direction substantially opposite to the laying direction until it reaches the tie-in position, which results in the configuration shown in FIG. 3. In certain embodiments, moving the first section 304 of the pipeline to the tie-in position 309 applies compression to the laid portion of the pipeline 302. Under such compression, bending is preferentially induced in the second section 306, producing a bend as shown in FIG. 3.

In an embodiment, the second section is not located in a first free span 311 of the pipeline 302. The first free span is a portion of the pipeline that is not in contact with the seabed, and is adjacent to the first section of the pipeline, and therefore adjacent to the tie-in position in the configuration shown in FIG. 3. The first free span exists because the tie-in position in the subsea structure is raised above the seabed by e.g. up to 1.5 m, and the pipeline therefore extends from a position where it is in contact with the seabed, to the tie-in position which is raised above the seabed. The first free span has a length of e.g. at least 5 m, between 20 and 50 m, between 20 and 100 m, or between 20 and 150 m. In the absence of a different section of the pipeline being configured to preferentially induce bending, bending would likely occur in the first free span under compression of the laid portion of the pipeline. Such bending or buckling in the first free span, if it occurs sufficiently close to the tie-in position, could damage the pipeline and/or the subsea structure and connections therebetween, and could make it difficult to achieve direct tie-in between the pipeline and the subsea structure. When bending is preferentially induced in the second section 306 as shown in FIG. 3, undesirable bending or buckling may be avoided in the first free span 311. It is noted that the preferentially induced bend in the second section will also accommodate thermal expansion of the pipeline during subsequent use of the pipeline, thereby potentially preventing undesirable bending or buckling in other portions of the pipeline.

Of course, there may be second, third or any number of additional free spans in the pipeline, for example where the seabed terrain is uneven and the pipeline therefore extends between high points of the terrain and at least a portion of the pipeline between the high points is not in contact with the seabed. It may in fact be beneficial for the second section to be located in such a free span, i.e. a free span that is not adjacent to the first section, because bending may be more preferentially induced in such a free span.

In an alternative embodiment (not shown in the FIGS.), the second section is located in the first free span. In this case, the first free span should be long enough that the bending can be induced in the second section without damaging the pipeline and/or the subsea structure and connections therebetween, and without making it unduly difficult to achieve direct tie-in between the pipeline and the subsea structure. In particular, the second section is preferably located far enough away from the tie-in position (while still being located in the first free span) that such undesirable consequences are avoided FIGS. 4A to 4C illustrate how the first section is pulled or pushed back to the tie-in position in an embodiment using a mechanism included in the subsea structure, and features of the subsea structure and the first section that facilitate this operation.

Figure 4A:
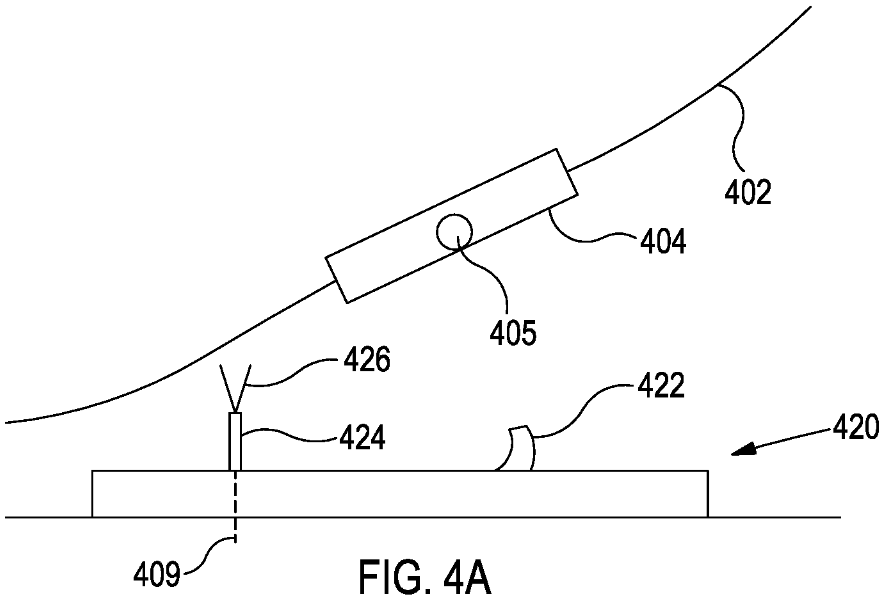
FIGS. 4A to 4C illustrates a procedure of pulling or pushing the first section of the pipeline back to the tie-in position.

FIG. 4A shows the pipeline 402 including the first section 404 at a stage before the first section 404 has been laid onto to the subsea structure 420. The subsea structure includes a pipe guide 426 and guide post 424, and a mechanism for pushing or pulling the first section of the pipeline to the tie-in position 409. The guide is post is located substantially at the tie-in position. The mechanism includes engagement means 422 for engaging with the first section 404. In this embodiment, said engagement means comprise anchor hook 422. The first section includes corresponding means 405 for engaging with the engagement means of the mechanism. In this embodiment said corresponding means include anchor post 405. Where the first section includes an integral manifold, the integral manifold includes such corresponding means. It is noted that whilst FIGS. 4A to C show a pipeline in which the first section is an intermediate section of the pipeline, in line with FIG. 1A, a pipeline end as shown in FIG. 1B may equally include such corresponding means and may be subjected to the operations illustrated in FIGS. 4A to C.

In an embodiment, the mechanism includes pistons, which are e.g. hydraulically powered, for pushing the first section to the tie-in position. In an alternative embodiment, the mechanism includes a winch attached to the subsea structure and a line for pulling the first section to the tie-in position.

Figure 4B:
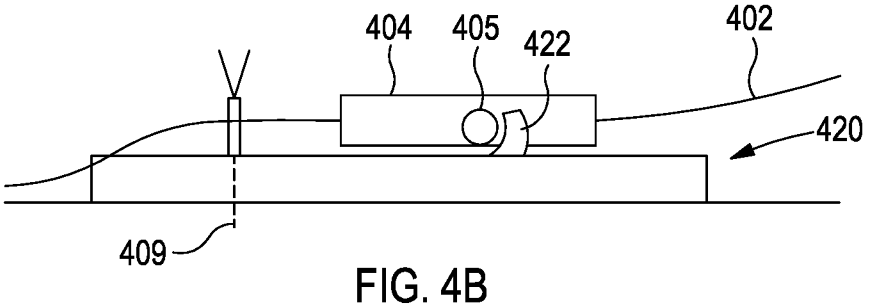
Figure 4C:
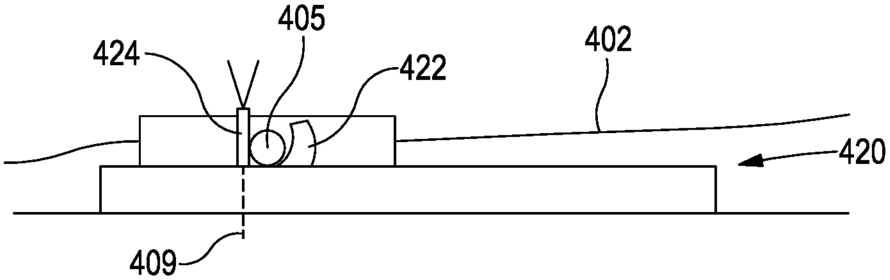

FIG. 4B shows the pipeline 402 after the first section has been laid onto the subsea structure, at a position beyond the tie-in position 409 in the laying direction. The anchor hook 422 is brought into engagement with the anchor post 405 of the first section. The mechanism is then used to push or pull the first section back to the tie-in position 409, as shown in FIG. 4C, such that the laid portion of the pipeline is placed under compression. The motion of the first section may be halted by abutment of the anchor post 405 against the guide post 424. Of course, any suitable mechanism may be used to push or pull the first section back to the tie-in position.

Figure 5:
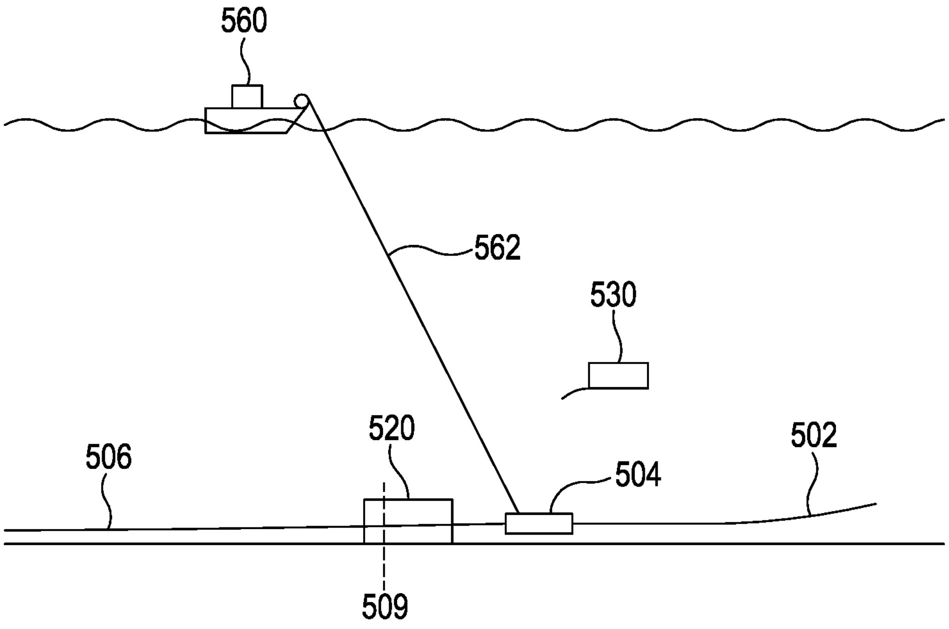
FIG. 5 illustrates another procedure of pulling or pushing the first section of the pipeline back to the tie-in position.

FIG. 5 illustrates how, in another embodiment, the first section is pulled or pushed back to the tie-in position using a vessel 560 and line 562, or an ROV 530. The pipeline 502 has been laid so that the first section of the pipeline is beyond the tie-in position 509 in the laying direction, and the second section 506 is configured so that bending will be preferentially induced in the second section under compression of the at least a portion of the pipeline including the first section and second section. In FIG. 5 the first section is shown as being laid on the seabed, outside of the subsea structure 520. Alternatively, the first section may be laid onto the subsea structure e.g. as shown in FIG. 2. A line 562 extending from a surface vessel 560 is attached to the first section of the pipeline. The line may extend from a winch on the vessel. In FIG. 5 the line is shown extending directly from the vessel 560 to the first section 504. The line may alternatively extend from the vessel through a point on the subsea structure, which may include e.g. a pulley, to the first section, 504. The line 562 is then used to pull the first section of the pipeline back to the tie-in position. In an embodiment an ROV 530 is used to assist with pulling the first section to the tie-in position, or is used alone to pull the first section back to the tie-in position. The vessel 560 and/or ROV 530 may include an automatic system to control the motion of first section, to prevent uncontrolled motion of the pipeline under compression.

Figure 6A:
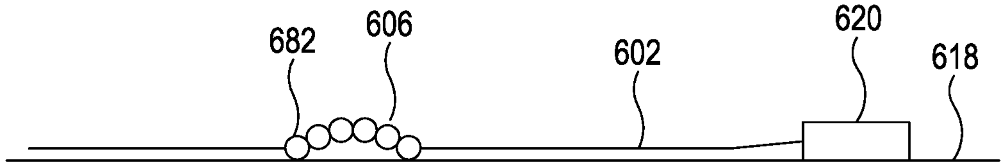
FIG. 6A illustrates the use of buoyancy adjustments in the second section of the pipeline to configure the second section for preferential bending.
Figure 6B:
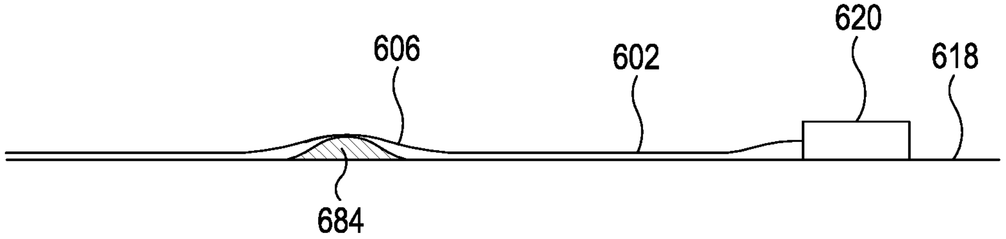
FIG. 6B illustrates the use of a physical feature to configure the second section for preferential bending.
Figure 6C:
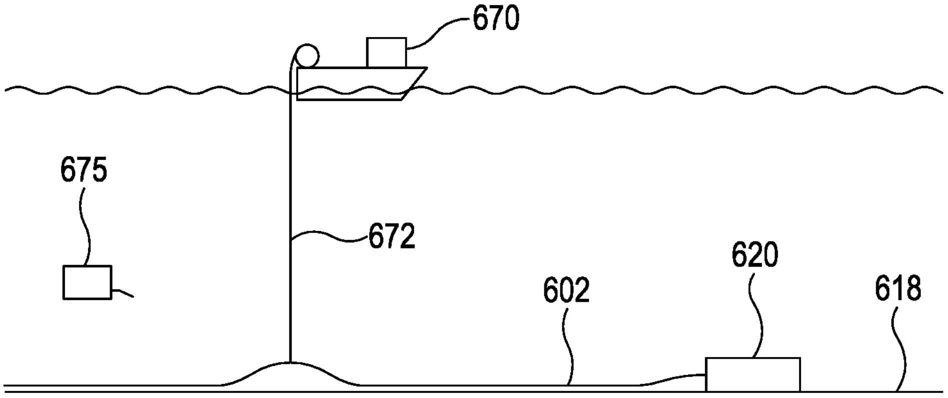
FIG. 6C illustrates the use of a vessel or ROV to configure the second section for preferential bending, or for pulling the first section back to the tie-in position.

FIGS. 6A to 6C illustrates different ways of configuring the second section 606 of the pipeline such that bending will be preferentially induced in the second section under compression of the laid portion of the pipeline including the first section and second section.

FIG. 6A illustrates an embodiment in which the second section 606 of the pipeline 602 is configured to preferentially induce bending by modifying the buoyancy of the second section 606. In particular, in the embodiment shown in FIG. 6A buoyancy units 682 are attached to the second section of the pipeline to increase the buoyancy of the second section. The buoyancy units are attached before the first section is pulled or pushed back to the tie-in position, either before the second section is laid, during laying of the second section, or after the second section is laid. After the buoyancy units are attached, the buoyancy units may be in contact with the seabed 618, or the buoyancy may be increased to such a degree that at least part of the second section is lifted off the seabed, and at least one of the buoyancy units is not in the contact with the seabed 618. This may provide a vertical displacement of the second section relative to the surrounding portions of the pipeline, providing an initial degree of bending in the second section. In an alternative embodiment, the buoyancy of the second section is increased by removing at least part of a coating of the second section of the pipeline, or replacing at least part of the coating with a different coating material with a higher buoyancy.

FIG. 6B illustrates an embodiment in which the second section 606 of the pipeline 602 is configured to preferentially induce bending by using a structure or feature 684 to displace the second section vertically or horizontally relative to adjacent sections of the pipeline. The structure or feature 684 is, for example, a gravel mound or berm, a second pipeline laid transverse to the laying direction of the pipeline 602, or any other suitable structure that provides a vertical and/or horizontal displacement of the second section 606. The second section is preferably laid onto the structure or feature 684. Alternatively, the structure or feature is installed after the second section 606 has been laid onto the seabed. The vertical and/or horizontal displacement of the second section relative to the surrounding portions of the pipeline provides an initial degree of bending in the second section, which means that the second section will be susceptible to preferential bending when the laid portion of the pipeline including the first and second sections is compressed.

FIG. 6C illustrates an embodiment in which the second section 606 of the pipeline 602 is configured to preferentially induce bending by using a vessel 670 and line 672, and/or an ROV or AUV 675, to displace the second section vertically and/or horizontally relative to adjacent sections of the pipeline. The vertical and/or horizontal displacement of the second section relative to the surrounding portions of the pipeline provides an initial degree of bending in the second section, which means that the second section will be susceptible to preferential bending when the laid portion of the pipeline including the first and second sections is compressed.

In an embodiment, the configuration illustrated in FIG. 6C is used to pull the first section back to the tie-in position. In particular, the second section is displaced vertically and/or horizontally, relative to adjacent sections of the pipeline, such that the first section is pulled back. In this example the at least a portion of the pipeline is placed under tension. In some cases, no other mechanism or procedure is required to push or pull the first section back to the tie-in position, and the vertical and/or horizontal displacement applied by the vessel 670 and line 672, and/or ROV or AUV 675, is sufficient on its own to pull the first section back to the tie-in position. The second section may be configured to preferentially induce bending. In an alternative example, no such configuration of the second section is required, since bending is actively applied in the second section by the vessel and line, and/or ROV or AUV. In this example, a method of installing a subsea pipeline having a direct tie-in between a first section of the pipeline and a subsea structure is applied, wherein, after installation, the first section is located at a tie-in position, the method comprising: laying at least a portion of the pipeline from a laying vessel, the at least a portion of the pipeline including the first section and a second section of the pipeline, such that the first section is beyond the tie-in position in the laying direction, and the first section and the tie-in position are beyond the second section in the laying direction; and displacing the second section vertically and/or horizontally to thereby place the at least a portion of the pipeline under tension and pull the first section back to the tie-in position.

FIGS. 7A to 7E illustrate an alternative or complementary method for pulling or pushing the first section of the pipeline back to the tie-in position, and bringing the first section into engagement in the tie-in position.

Figure 7A:
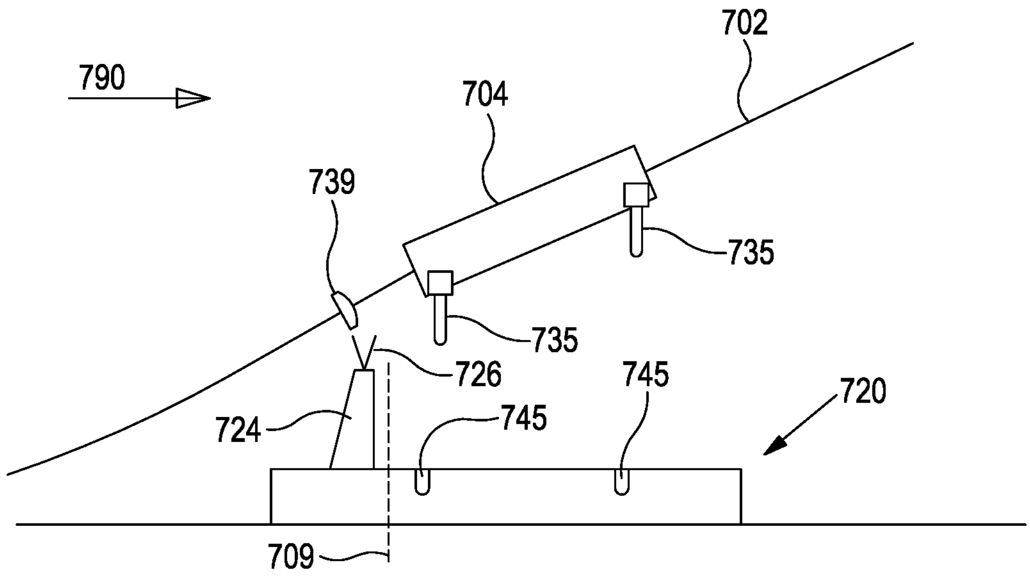
FIGS. 7A to 7E illustrates another procedure of pulling or pushing the first section of the pipeline back to the tie-in position.

As shown in FIG. 7A, at least a portion of a pipeline 702 is being laid in a direction indicated by arrow 790. The at least a portion of the pipeline 702 includes a first section 704, and a second section (not shown here) in line with the description above. In the embodiment illustrated in FIGS. 7A to 7E, the first section includes an integral manifold 704. The first section includes mechanism 735 for bringing the first section into engagement in the tie-in position 709 and/or pulling or pushing the first section of the pipeline back to the tie-in position 709. A subsea structure 720 is located at or near the seabed. The subsea structure 720 is e.g. a template or wellhead structure. The subsea structure includes a pipe guide 726 and a fine guide 724. In the embodiment of FIGS. 7A to 7E, the mechanism 735 is included in the integral manifold in the first section, and the mechanism 735 includes four pistons configured to engage with corresponding engagement portions 745 of the subsea structure. Of course, any suitable number of pistons may be used, e.g. two or three, or more than four.

The at least a portion of the pipeline 702 also includes a collar 739 that is configured to engage with a guide of the subsea structure, e.g. the fine guide 724, to pull the first section back in a direction substantially opposite to the laying direction 790. The collar 739 is fixed to the pipeline 702 or is integral with the pipeline, and has a larger diameter than the pipeline. In particular, the pipeline is narrow enough to pass through a gap in the fine guide 724, but the collar has a diameter that is larger than the gap in the fine guide, and when the collar is engaged with the fine guide the pipeline is therefore prevented from moving longitudinally in the laying direction by said engagement. The collar has e.g. a frustoconical profile facing in the laying direction.

FIG. 7A shows a first step in which the first section 704 is being lowered towards the subsea structure 720. The pistons of the mechanism 735 are in an extended configuration. Each piston is coupled to the manifold such that the piston is free to rotate about the coupling point, e.g. using a hinge or bolt.

Figure 7B:
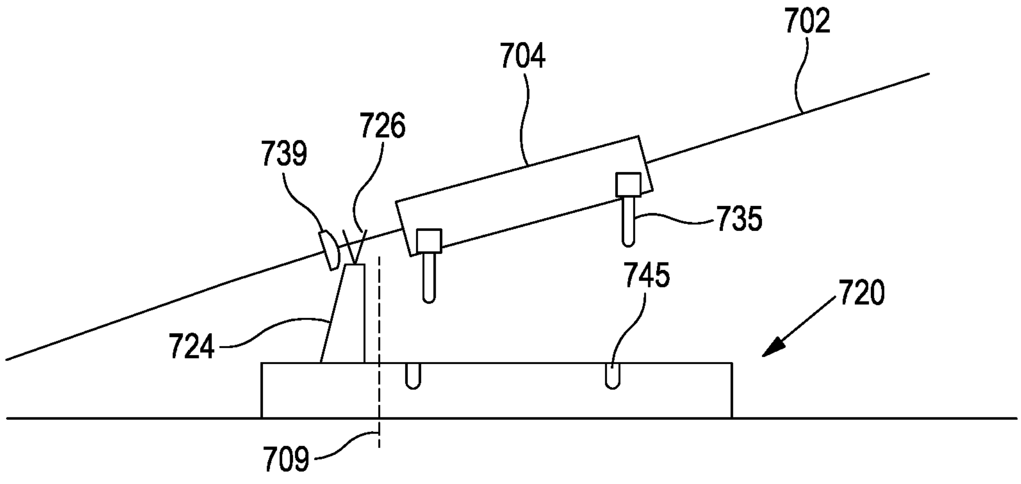

In FIG. 7B, the pipeline 702 is engaged with the pipe guide 726 to ensure that the first section is laid in the correct alignment, and the collar 739 is in initial engagement with the fine guide 724.

Figure 7C:
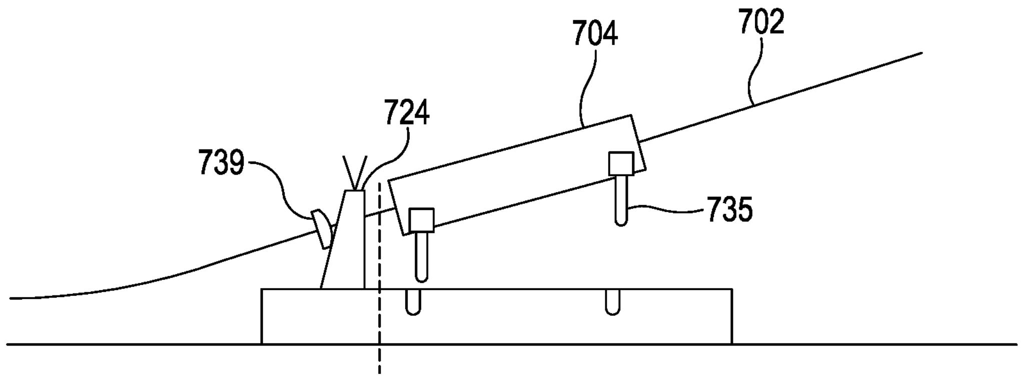

In a subsequent step, as illustrated in FIG. 7C, the first section is lowered further towards the subsea structure. As the pipeline and first section is lowered, the collar 739 remains in engagement with the fine guide 724. An engagement surface of the fine guide (where the engagement surface is a surface that is in contact with the collar) is sloped, so that in a side elevation (as shown in FIGS. 7A to 7E) the fine guide is wider in the laying direction at its bottom that at its top. This means that as the first section (and hence the collar) is lowered, the collar is forced in a direction substantially opposite to the laying direction. This pulls the pipeline, and the first section, back towards the tie-in position 709 as shown in FIG. 7C.

Figure 7D:
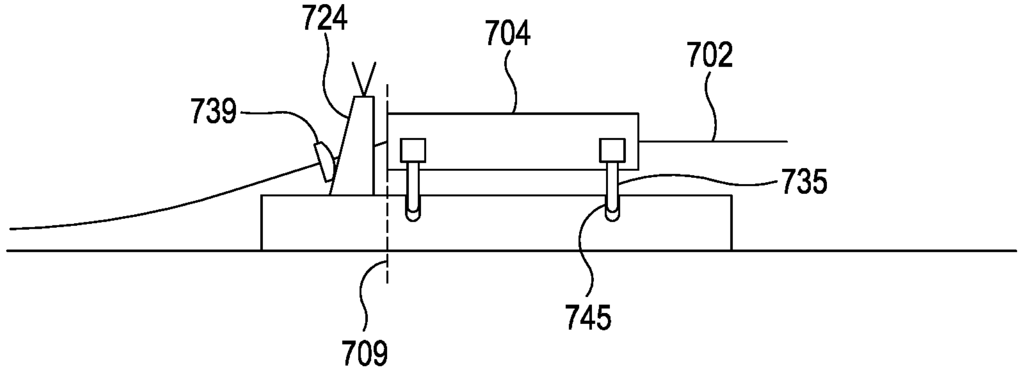
Figure 7E:
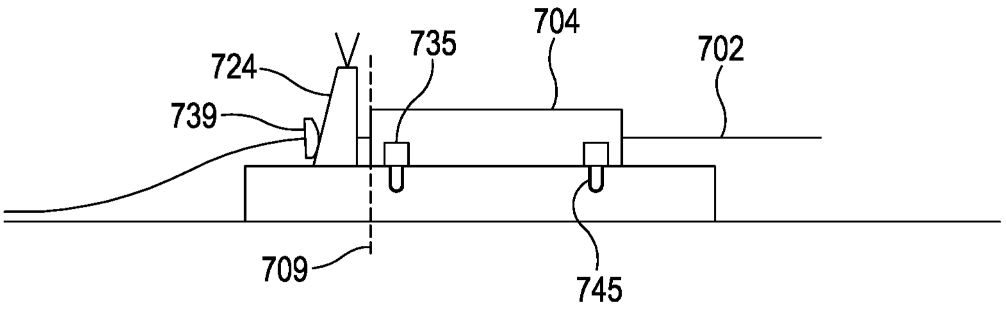

As shown in FIG. 7D, the first section is laid onto the subsea structure, the first section is at or close to the tie-in position, and the pistons of the mechanism 735 are brought into engagement with the engagement portions 745 of the subsea structure, resulting in the configuration shown in FIG. 7D. The pistons are still in the extended configuration, so the manifold is not in full engagement/contact with the subsea structure. In an embodiment, a distal portion of each piston (i.e. the opposite end of the piston relative to the portion of the piston that is coupled to the first section) includes an aperture, and each engagement portion 745 of the subsea structure includes a bolt that is coupled to the subsea structure, and is configured to pass through the aperture of the piston and retain the distal portion of the piston in place.

The pistons are then activated, i.e. moved from an extended configuration into a contracted configuration, to bring the first section closer to the subsea structure, e.g. into full engagement/contact. This results in the configuration shown in FIG. 7E. This action may also pull/push the first section further back to the tie-in position, in the event that the engagement of the collar and fine guide while lowering the first section does not fully pull/push the first section back to the tie-in position. In this case, when the pistons 735 are in an extended configuration they are orientated at an angle relative to the vertical (i.e. they are not perpendicular to the plane in which the template is substantially located). The pistons are then activated, and as the pistons move from the extended configuration into the contracted configuration, the first section is pulled back to the tie-in position, and the pistons gradually move towards an orientation in which they are perpendicular to the substantially horizontal plane in which the subsea structure is located.

Figure 8:
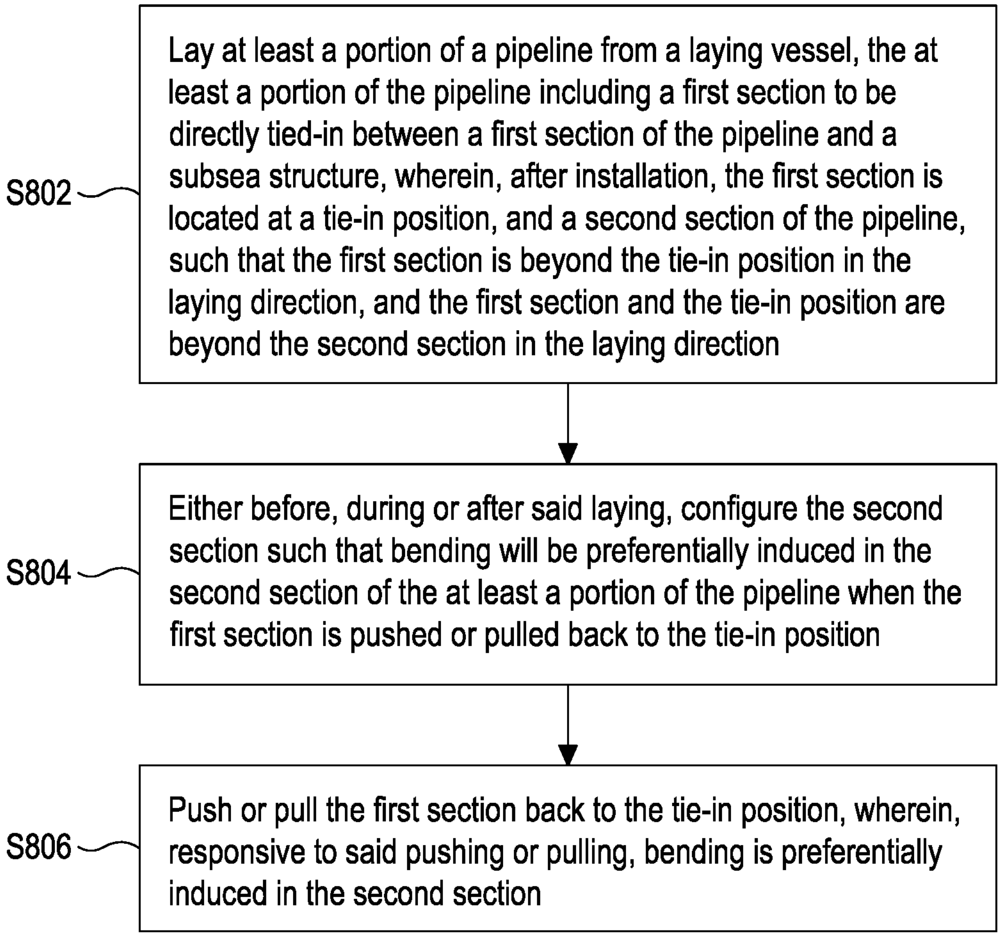
FIG. 8 shows a high-level flow diagram.

FIG. 8 shows a high-level flow diagram describing the method of the invention. In step 802, at least a portion of a pipeline is laid from a laying vessel, the at least a portion of the pipeline including a first section to be directly tied-in between a first section of the pipeline and a subsea structure, wherein, after installation, the first section is located at a tie-in position, and a second section of the pipeline, wherein the at least a portion of the pipeline is laid such that the first section is beyond the tie-in position in the laying direction, and the first section and the tie-in position are beyond the second section in the laying direction. In step 804, either before, during or after said laying, the second section is configured such that bending will be preferentially induced in the second section of the at least a portion of the pipeline when the first section is pushed or pulled back to the tie-in position. In step 806, the first section is pulled or pushed back to the tie-in position, wherein, responsive to said pushing or pulling, bending is preferentially induced in the second section.

It will be appreciated by the person of skill in the art that various modifications may be made to the above described embodiments without departing from the scope of the present invention.

The invention claimed is:

1. A method of installing a subsea pipeline having a direct tie-in between a first section of the pipeline and a subsea structure, wherein, after installation, the first section is located at a tie-in position, the method comprising:

laying at least a portion of the pipeline from a laying vessel moving in a laying direction, the at least a portion of the pipeline including the first section and a second section of the pipeline, such that the first section is beyond the tie-in position in the laying direction, and the first section and the tie-in position are beyond the second section in the laying direction;

either before, during or after said laying, configuring the second section such that bending will be induced in the second section of the at least a portion of the pipeline when the first section is pushed or pulled back to the tie-in position, wherein configuring the second section includes displacing the second section horizontally and/or vertically while bending using a wire extending from one of a second vessel, a remotely operated vehicle and an autonomous underwater vehicle, the wire being directly connected to the second section such that the vertical or horizontal displacement of the second section provides an initial degree of bending in the second section; and pushing or pulling the first section back to the tie-in position, wherein, responsive to said pushing or pulling, bending is induced in the second section, and wherein the first section includes features configured to engage with a mechanism of the subsea structure for pushing or pulling the first section back to the tie-in position.

2. The method of claim 1, wherein the first section of the pipeline includes an end of the pipeline.

3. The method of claim 1, wherein the first section of the pipeline includes an intermediate section of the pipeline.

4. The method of claim 1, wherein said laying includes laying the first section of the pipeline onto the subsea structure.

5. The method of claim 1, wherein the first section of the pipeline includes an integral manifold for direct tie-in to the subsea structure.

6. The method of claim 1, wherein the at least a portion of the pipeline includes a collar configured to engage with a fine guide of the subsea structure to pull the first section back towards the tie-in position as the first section is lowered towards the subsea structure.

7. The method of claim 1, wherein the second section is not located in a first free span of the pipeline, wherein the first free span is a portion of the pipeline that is adjacent to the tie-in position and is not in contact with a seabed.

8. The method of claim 1, wherein the subsea structure is a template.

9. The method of claim 1, wherein the second section rests on a sea floor.

10. A method of installing a subsea pipeline having a direct tie-in between a first section of the pipeline and a subsea structure, wherein, after installation, the first section is located at a tie-in position, the method comprising:

laying at least a portion of the pipeline from a laying vessel moving in a laying direction, the at least a portion of the pipeline including the first section and a second section of the pipeline, such that the first section is beyond the tie-in position in the laying direction, and the first section and the tie-in position are beyond the second section in the laying direction;

either before, during or after said laying, configuring the second section such that bending will be induced in the second section of the at least a portion of the pipeline when the first section is pushed or pulled back to the tie-in position, wherein configuring the second section includes displacing the second section horizontally and/or vertically while bending using a wire extending from one of a second vessel, a remotely operated vehicle and an autonomous underwater vehicle, the wire being directly connected to the second section such that the vertical or horizontal displacement of the second section provides an initial degree of bending in the second section; and pushing or pulling the first section back to the tie-in position, wherein, responsive to said pushing or pulling, bending is induced in the second section, and wherein the first section is pulled or pushed back to the tie-in position using a mechanism installed in the subsea structure.

11. A method of installing a subsea pipeline having a direct tie-in between a first section of the pipeline and a subsea structure, wherein, after installation, the first section is located at a tie-in position, the method comprising:

laying at least a portion of the pipeline from a laying vessel moving in a laying direction, the at least a portion of the pipeline including the first section and a second section of the pipeline, such that the first section is beyond the tie-in position in the laying direction, and the first section and the tie-in position are beyond the second section in the laying direction;

either before, during or after said laying, configuring the second section such that bending will be induced in the second section of the at least a portion of the pipeline when the first section is pushed or pulled back to the tie-in position, wherein configuring the second section includes displacing the second section horizontally and/or vertically while bending using a wire extending from one of a second vessel, a remotely operated vehicle and an autonomous underwater vehicle, the wire being directly connected to the second section such that the vertical or horizontal displacement of the second section provides an initial degree of bending in the second section; and pushing or pulling the first section back to the tie-in position, wherein, responsive to said pushing or pulling, bending is induced in the second section, and wherein the first section is pulled or pushed back to the tie-in position using a mechanism included in the first section.

* * * * *